United States Patent
Lin

(10) Patent No.: US 9,420,249 B2
(45) Date of Patent: Aug. 16, 2016

(54) METHOD AND APPARATUS FOR GENERATING THUMBNAIL FILE

(71) Applicant: MStar Semiconductor, Inc., Hsinchu Hsien (TW)

(72) Inventor: Chia-Hung Lin, Hsinchu Hsien (TW)

(73) Assignee: MStar Semiconductor, Inc., Hsinchu Hsien (TW)

(*) Notice: Subject to any disclaimer, the term of this patent is extended or adjusted under 35 U.S.C. 154(b) by 24 days.

(21) Appl. No.: 13/889,435

(22) Filed: May 8, 2013

(65) Prior Publication Data

US 2014/0064698 A1    Mar. 6, 2014

(30) Foreign Application Priority Data

Sep. 3, 2012    (TW) .............................. 101132041 A

(51) Int. Cl.
    *H04N 5/92*        (2006.01)
    *H04N 9/79*        (2006.01)
    *G06F 17/30*      (2006.01)
    *H04N 9/82*        (2006.01)

(52) U.S. Cl.
    CPC .................. *H04N 9/79* (2013.01); *G06F 17/30* (2013.01); *H04N 9/8227* (2013.01)

(58) Field of Classification Search
    CPC ......... H04N 9/79; H04N 5/85; H04N 9/8042; G11B 27/105; G11B 27/329; G11B 27/034
    USPC .......................................................... 386/241
    See application file for complete search history.

(56) References Cited

U.S. PATENT DOCUMENTS

| | | | |
|---|---|---|---|
| 2003/0103604 A1* | 6/2003 | Kato et al. ...................... | 379/68 |
| 2004/0128317 A1* | 7/2004 | Sull et al. .................... | 707/104.1 |
| 2005/0018775 A1* | 1/2005 | Subramanian et al. .. | 375/240.25 |
| 2007/0223878 A1* | 9/2007 | Abe et al. ........................ | 386/95 |
| 2009/0034940 A1* | 2/2009 | Hamada et al. ............... | 386/126 |
| 2010/0266012 A1* | 10/2010 | Chen ........................ | 375/240.12 |
| 2011/0090399 A1* | 4/2011 | Whitaker et al. ............. | 348/500 |
| 2012/0155833 A1* | 6/2012 | Narayanan et al. ........... | 386/241 |
| 2012/0173536 A1* | 7/2012 | Shahraray et al. ............ | 707/741 |
| 2013/0002950 A1* | 1/2013 | Thompson .................... | 348/500 |
| 2013/0071087 A1* | 3/2013 | Motiwala et al. ............. | 386/241 |

\* cited by examiner

*Primary Examiner* — William Tran

(74) *Attorney, Agent, or Firm* — Edell, Shapiro & Finnan, LLC

(57) ABSTRACT

A method for generation a thumbnail file is provided. The method includes: receiving a command; obtaining time information corresponding to the command and a frame to be output; adjusting the frame to be output to a predetermined resolution according to a resolution of the frame to be output to generate a thumbnail; and generating the thumbnail file according to the time information and the thumbnail.

5 Claims, 4 Drawing Sheets

METHOD AND APPARATUS FOR GENERATING THUMBNAIL FILE

This application claims the benefit of Taiwan application Serial No. 101132041, filed Sep. 3, 2012, the subject matter of which is incorporated herein by reference.

BACKGROUND OF THE INVENTION

1. Field of the Invention

The invention relates in general to digital video recording, and more particularly to a method and apparatus for generating thumbnails for digital video recording.

2. Description of the Related Art

In form of rougher or smaller icons or images, thumbnails are a presentation of larger images or picture frames according to related techniques for allowing users to more quickly identify a desired target. The architecture of a conventional video recorder frequently results in certain issues, especially user inconveniences. For example, when a conventional digital video recorder performs a simple operation of fast-forwarding or rewinding along a time axis, a user can only identify a target image during the fast-forward or rewind process through guessing a time point of the target image. That is to say, such method, in which users can only search for the target image by merely recalling a corresponding time point or by constantly fast-forwarding or rewinding, is quite inefficient. As another example, the conventional digital video recorder may also display a certain intra-frame (I frame) for users to guess, estimate or compare a time point at which a target image appears. However, an original transport stream does not carry complete image messages of other types of frames such as predictive frames (P frames) and bi-directional frames (B frames), and so no image information can be directly converted from the image messages. Hence, users can only observe an image of an I frame near the expected time point rather than the precise target image, meaning that such method yields an imprecise result. Further, this architecture needs to support high-level hardware devices such as a graphics engine that occupies the performance of a processor. Therefore, there is a need for a solution for enhancing the performance of digital video recorders as well as user viewing experiences.

SUMMARY OF THE INVENTION

According to an aspect of the present invention, a method for generating a thumbnail file is provided. The method comprises: receiving a command; obtaining time information corresponding to the command and a frame to be output; adjusting the frame to be output to a predetermined resolution according to a resolution of the frame to be output to generate a thumbnail; and generating the thumbnail file according to the thumbnail.

According to another aspect of the present invention, an apparatus for generating a thumbnail file is provided. The apparatus comprises: a reception unit, for receiving a command; an extraction unit, for obtaining a frame to be output according to the command; a processing circuit, for adjusting the frame to be output to a predetermined resolution according to a resolution of the frame to be output to generate a thumbnail; and a thumbnail file generation unit, for obtaining time information according to the command and generating the thumbnail file according to the time information and the thumbnail.

According to another aspect of the present invention, a playback method based on a thumbnail file is provided. The method comprises: receiving a command corresponding to the thumbnail file; obtaining a timestamp and a presentation timestamp corresponding to the thumbnail file; obtaining and demultiplexing encoded data corresponding to the thumbnail file to generate a plurality of demultiplexed results comprising a predetermined demultiplexed result, and selecting the predetermined demultiplexed result according to the timestamp, wherein the demultiplexed results respectively comprise different timestamps; decoding the predetermined demultiplexed result to generate a plurality of decoded data comprising predetermined decoded data, and selecting the predetermined decoded data according to the presentation timestamp, wherein the decoded data respectively comprise different presentation timestamps; and starting playback from the predetermined decoded data.

In digital video recording operations, a digital multimedia recording/playback system implementing the method and apparatus disclosed by the present invention is capable of, in real-time, recording thumbnails and associated information of user-preferred time points according to user controls. When a user selects a digital video recorded section, the digital multimedia recording/playback system is capable of precisely providing the user with thumbnails of user-preferred time points for the user to choose from, thereby enhancing user viewing experiences by precisely offering the user with options of user-preferred time points.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
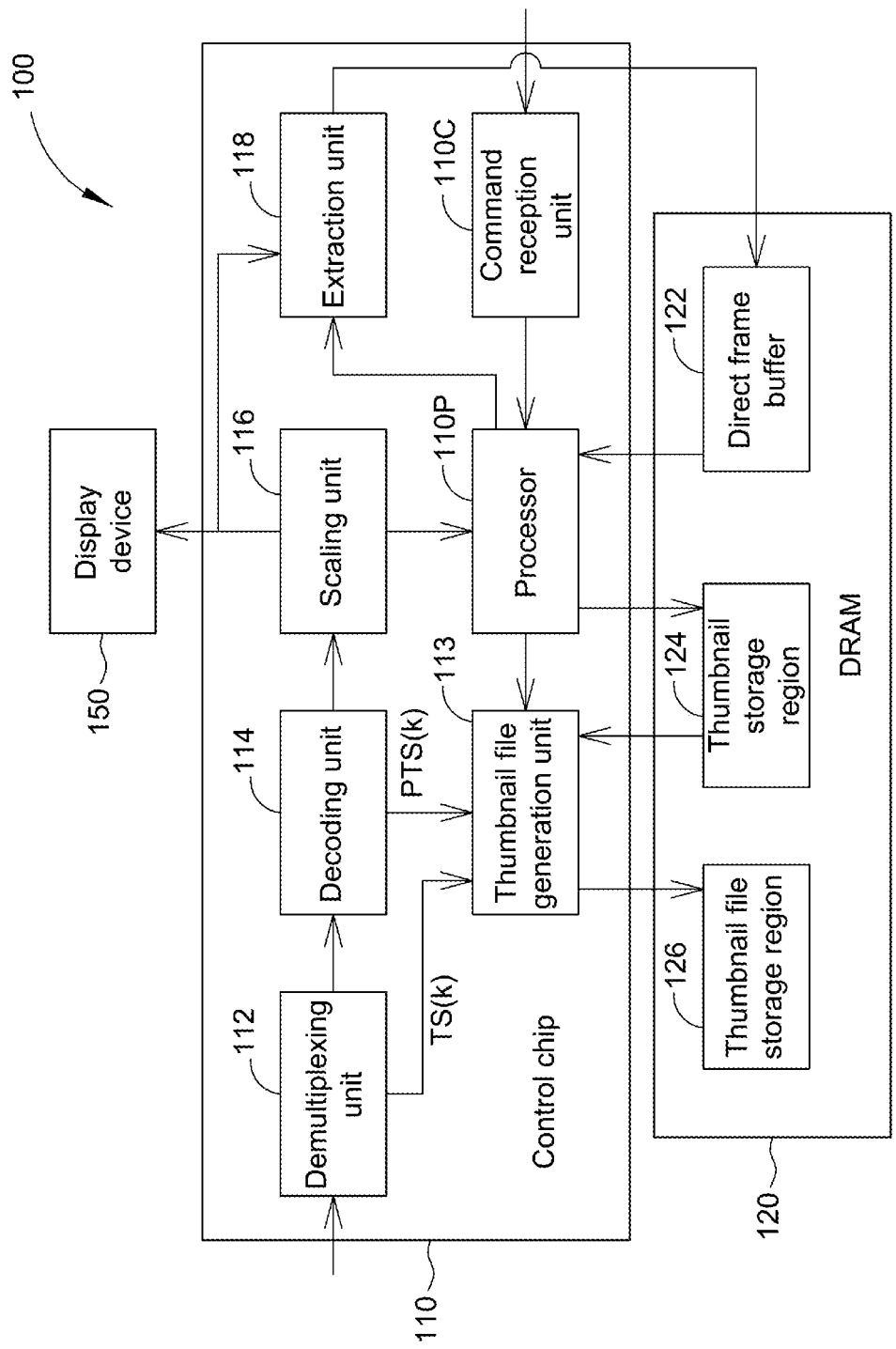
FIG. 1 is a schematic diagram of an apparatus for generating a thumbnail according to an embodiment of the present invention.

FIG. 1 is a schematic diagram of an apparatus 100 for generating a thumbnail according to an embodiment of the present invention. The apparatus 100 may comprise at least a part (e.g., a part or all) of a digital multimedia recording/playback system. For example, the apparatus 100 may comprise a part of the digital multimedia recording/playback system, a control circuit in the digital multimedia recording/playback system, or an entire part of the digital multimedia recording/playback system (i.e., the entirety of the digital multimedia recording/playback system).

As shown in FIG. 1, the apparatus 100 comprises a control chip 110, a storage module such as a dynamic random access memory (DRAM) 120 and a display device 150. In the embodiment, the control chip 110 comprises a demultiplexing unit 112, a thumbnail file generation unit 113, a decoding unit 114, a scaling unit 116, an extraction unit 118, a command reception unit 110C and a processor 110P. The storage module, such as the DRAM 120, comprises a direct frame buffer 122, a thumbnail storage region 124 and a thumbnail file storage region 126. In practice, the storage module, such as the DRAM 120, may comprise a plurality of buffers, and more particularly independent buffers, such as the direct frame buffer 122, the thumbnail storage region 124, the thumbnail file storage region 126 and an output queue (not shown) of the scaling unit 116. The output queue is for temporarily storing a frame that the scaling unit 116 transmits to the display device 150.

In the embodiment, the control chip 110 may comprise a processing circuit. The processing circuit represents the processor 110P executing at least a code (not shown, e.g., at least one software module), and is capable of controlling a data stream supplied to control chip 110 and a corresponding operation procedure. For clear illustrations, for example, the processing circuit is directly depicted as the processor 110P in FIG. 1. The processor 110P executing the at least one code (e.g., the at least one software module) or other codes (e.g., other software modules) may also be utilized to implement modules/units/elements not shown in the apparatus 100. According to an alternative embodiment, at least a part of modules/units/elements in the control chip 110 may be integrated into the processor 110P.

According to the embodiment in FIG. 1, the apparatus 100 performs a digital video recording operation to record a digital video recorded program for a user. In the digital video recording operation, when the user sends a specific command CMD at a specific time point T(k), the command reception unit 110C receives the specific command, and the thumbnail file generation unit 113 obtains a timestamp TS(k) and a presentation timestamp PTS(k) corresponding to the specific time point T(k), where the index k is a positive integer, for example. The timestamp and the presentation timestamp are both utilized for marking the time for playing a frame. Further, as the timestamp TS(k) has a minimum unit of 1 second whereas the presentation timestamp PTS(k) has a minimum unit of less than 1 second, it is possible that different frames have different presentation timestamps PTS(k) but the same timestamp TS(k). In the digital video recording operation, when the user sends the specific command CMD at the specific time point T(k), the command reception unit 110C receives the specific command CMD, and the extraction unit 118 obtains a frame F(T(k)) to be output corresponding to the specific time point T(k). Further, the processing circuit (particularly the processor 110P executing the at least one code) adjusts at least one of a size and a resolution of the frame F(T(k)) to be output according to reference information provided by the scaling unit 116 to generate an adjusted picture P(k), and utilizes the adjusted picture P(k) as a thumbnail corresponding to the specific time point T(k). Further, the thumbnail file generation unit 113 generates a thumbnail file containing mapping information according to the timestamp TS(k), the presentation timestamp PTS(k) and the thumbnail (i.e., the adjusted picture P(k)), and temporarily stores the thumbnail file in the thumbnail file storage region 126. The mapping information in the thumbnail file indicates that the thumbnail corresponds to the timestamp TS(k) and the presentation timestamp PTS(k). In practice, for example, the apparatus 100 may store and backup the thumbnail file to a non-volatile memory module/unit/element (e.g., an optical disk, a hard drive and/or a flash memory). According to an alternative embodiment, the apparatus 100 (particularly the thumbnail file generation unit 113) may directly store the thumbnail file to the above non-volatile storage module/unit/element.

The demultiplexing unit 112 demultiplexes encoded data generated by the digital video recording operation to generate demultiplexed results comprising the timestamp TS(k). For example, the demultiplexed results may be packetized elementary streams (PESs), and the timestamp TS(k) may be stored in a PES header at the forefront of the PESs. The decoding unit 114 decodes the demultiplexed results to generate decoded data comprising the presentation timestamp PTS(k). For example, the decoded data may be packets, and the presentation timestamp PTS(k) may be stored in a packet header in the forefront of the packets. As shown in FIG. 1, the thumbnail file generation unit 113 retrieves the timestamp TS(k) from the demultiplexed results outputted by the demultiplexing unit 112, and retrieves the presentation timestamp PTS(k) from the decoded data outputted by the decoding unit 114. Further, in the digital video recording operation, when the user sends the specific command CMD at the specific time point T(k), the command reception unit 110C receives the specific command, and the extraction unit 118 obtains the frame F(T(k)) to be output corresponding to the specific time point from the above output queue of the scaling unit 116, for example.

In the embodiment, at least a part of the decoded data represents a decoded output frame $F_{DECODER\_OUT}(T(k))$, and the scaling unit 116 selectively scales the decoded output frame $F_{DECODER\_OUT}(T(k))$ to generate the frame F(T(k)) to be output, or bypasses the decoded output frame $F_{DECODER\_OUT}(T(k))$ as the frame F(T(k)) to be output. In practice, for example, the reference information comprises the size of the decoded output frame $F_{DECODER\_OUT}(T(k))$. According to a predetermined size (particularly a predetermined size for a thumbnail) and the size of the decoded output frame $F_{DECODER\_OUT}(T(k))$, the processing circuit adjusts at least one of the size and resolution of the frame F(T(k)) to be output to generate the adjusted picture P(k), wherein the predetermined size is smaller than the size of the frame F(T(k)) to be output. The above example is for illustrating the present invention and is not to be construed as limiting the present invention. According to another embodiment of the present invention, the reference information may comprise a scaling ratio. The scaling ratio indicates that the scaling unit 116 scales the decoded output frame $F_{DECODER\_OUT}(T(k))$ to generate the frame F(T(k)) to be output or bypasses the decoded output frame $F_{DECODER\_OUT}(T(k))$ as the frame F(T(k)) to be output. According to the predetermined size and the scaling ratio, the processing circuit adjusts at least one of the size and resolution of the frame F(T(k)) to be output to generate the adjusted picture P(k).

In the embodiment in FIG. 1, for example, the processing circuit (particularly the processor 110P executing the at least one code) may adjust at least one of the size and resolution of the frame F(T(k)) to be output according to the reference information to generate the adjusted picture P(k). According to an alternative embodiment of the present invention, the processing circuit (particularly the processor 110P executing the at least one code) may adjust the size and the resolution of the frame F(T(k)) to be output according to the reference information to generate the adjusted picture P(k).

Figure 2:
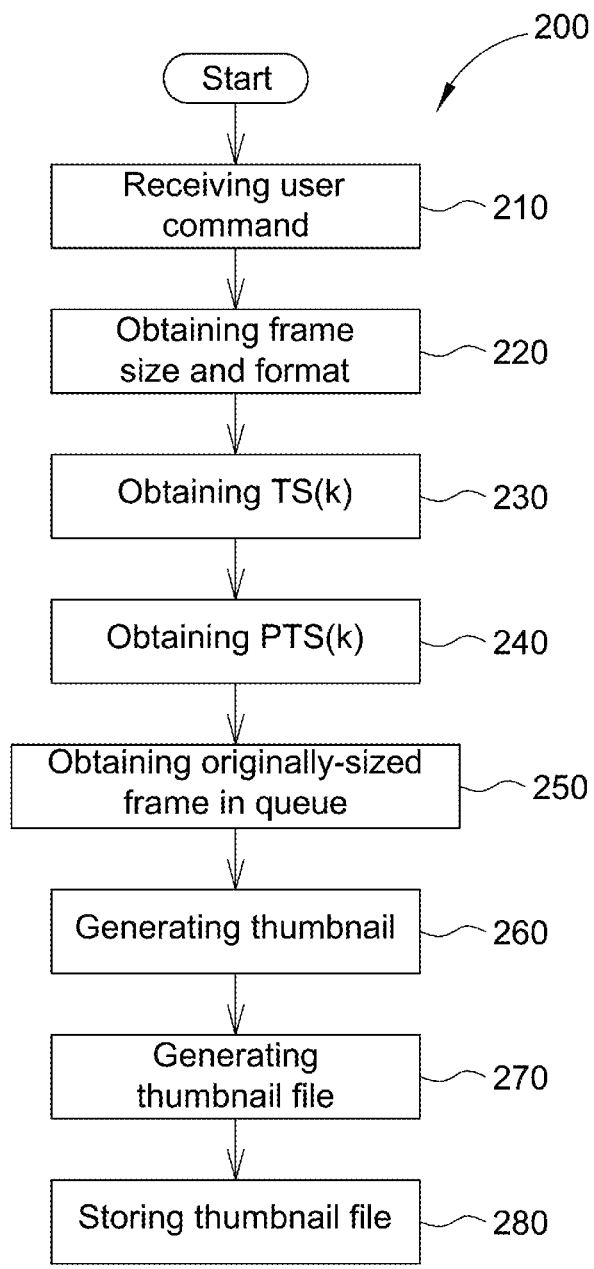
FIG. 2 is a flowchart of a method for generating a thumbnail according to an embodiment of the present invention.

FIG. 2 shows a flowchart of a method 200 for generating a thumbnail according to an embodiment of the present invention. The method 200 is applicable to the apparatus 100, and comprises the following steps.

In step 210, the command reception unit 110C receives a user command such as the specific command CMD. In the embodiment, the user sends the specific command CMD at the specific time point T(k) in the digital video recorded program.

In step 220, the processing circuit (e.g., the processor 110P executing the at least one code) obtains a size and a format of a frame, and more particularly, obtains the size and the format of the decoded output frame $F_{DECODER\_OUT}(T(k))$ according to the reference information.

In step 230, the thumbnail file generation unit 113 obtains the timestamp TS(k).

In step 240, the thumbnail file generation unit 113 obtains the presentation timestamp PTS(k).

In step 250, the extraction unit 118 obtains a frame in an original size such as the frame F(T(k)) to be output in a queue (i.e., the output queue), and temporarily stores the frame F(T(k)) to be output in the direct frame buffer 122.

In step 260, the processing circuit (particularly the above processor 110P executing the at least one code) generates a thumbnail, e.g., the adjusted picture P(k), and temporarily stores the thumbnail in the thumbnail storage region 124.

In step 270, the thumbnail file generation unit 113 generates the above thumbnail file, and temporarily stores the thumbnail file in the thumbnail file storage region 126.

In step 280, the apparatus 100 (e.g., the thumbnail file generation unit 113, or the processing circuit, particularly the above processor 110P executing the at least one code) stores the thumbnail file, and more particularly, stores the thumbnail file to above the non-volatile memory module/unit/element.

Figure 3:
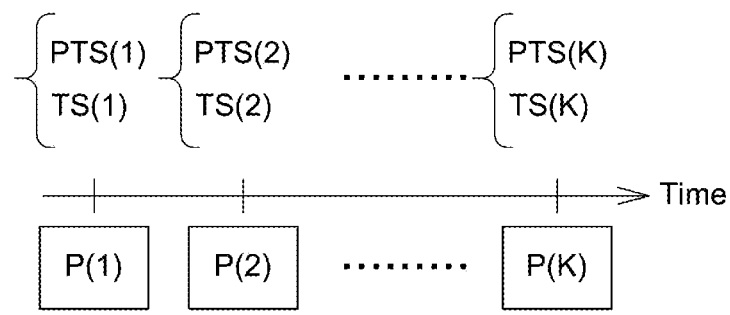
FIG. 3 shows details of the method in FIG. 2 according to an embodiment.

FIG. 3 shows details of the method 200 in FIG. 2 according to an embodiment. For example, the above index k is a positive integer varying from 1 to K. According to the embodiment, the apparatus 100 (e.g., the thumbnail file generation unit 113, or the processing circuit, particularly the above processor 110P executing the at least one code) records different sets of information such as {(TS(k), PTS(k), P(k) |k=1, 2, . . . , K) respectively corresponding to numerous times points {T(1), T(2), . . . , T(K)} into the thumbnail file.

According to the embodiment, the processing circuit (particularly the above processor 110P executing the at least one code) controls the apparatus 100 to output a graphic user interface to be displayed by the display device 150 according to a pattern in FIG. 3. In FIG. 3, the lower part represents the thumbnails {P(1), P(2), . . . , P(K)} in the graphic user interface, and the upper part represents time values of numerous sets of time values of time points (i.e., {(PTS(1), TS(1)), (PTS(2), TS(2)), . . . , (PTS(K), TS(K))} corresponding to the thumbnails {P(1), P(2), . . . , P(K)}, with the precision of the time value represented by each of the presentation timestamps being far higher than the precision of the time value represented by each of the timestamps). Hence, when the user wishes to view the above digital video recorded program, the user is allowed to readily select a desired digital video recorded section from different digital video recorded sections corresponding to the times points {T(1), T(2), . . . , T(K)} according to personal preferences.

Figure 4:
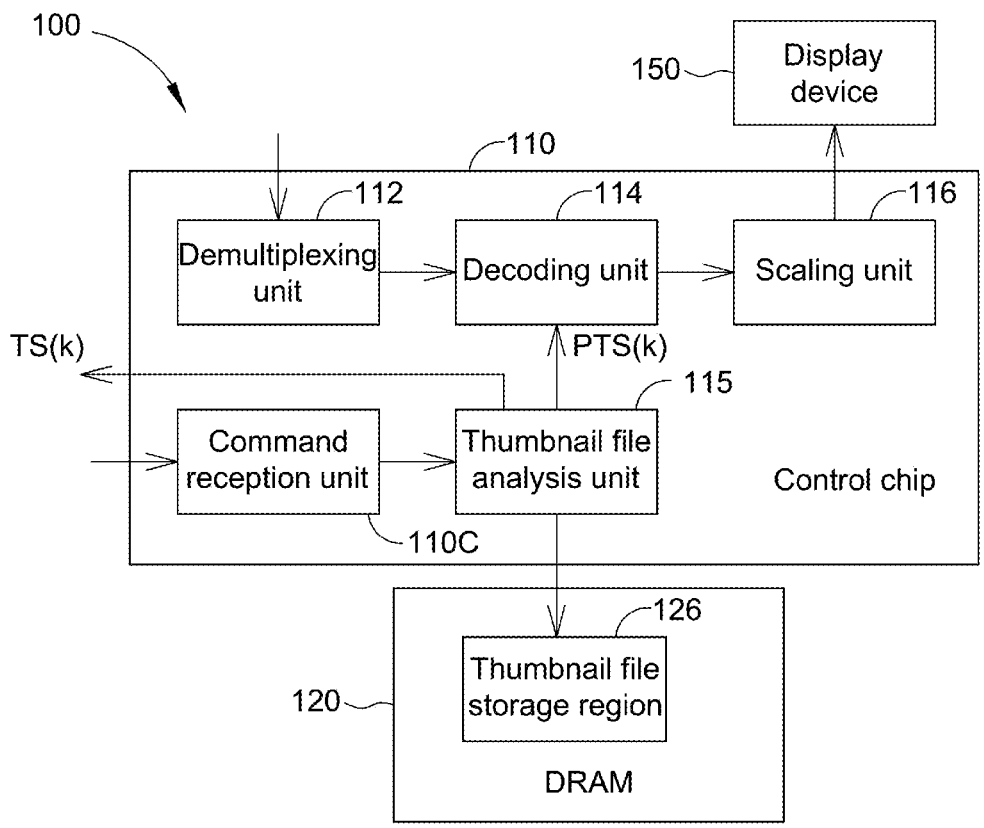
FIG. 4 shows an architecture involved for playing a selected thumbnail in the apparatus 100 in FIG. 1 according to an embodiment.

FIG. 4 shows an architecture involved for playing a selected thumbnail in the apparatus 100 in FIG. 1 according to an embodiment. As shown in FIG. 4, the apparatus 100 may further comprise a thumbnail file analysis unit 115. The thumbnail file analysis unit 115 analyzes the above thumbnail file according to a predetermined file format. More particularly, the predetermined file format is a file format that the thumbnail file generation unit 113 employs for generating the thumbnail file, and so the thumbnail file analysis unit 115 may analyze the thumbnail file according to the predetermined file format to obtain the numerous sets of information such as {(TS(k), PTS(k), P(k) |k=1, 2, . . . , K) corresponding to the times points {T(1), T(2), . . . , T(K)}.

In practice, the processing circuit (particularly the above processor 110P executing the at least one code) may determine and select a data stream corresponding to the timestamp TS(k) according to the timestamp TS(k) outputted by the thumbnail file analysis unit 115, so as to input the data stream corresponding to the timestamp TS(k) to the demultiplexing unit 112 in the architecture in FIG. 4. For example, the demultiplexing unit 112 demultiplexes the data stream to generate demultiplexed results corresponding to time points near the time point T(k) (in the digital video recorded program). The demultiplexed results comprise the timestamp TS(k). The decoding unit 114 accurately selects the demultiplexed results corresponding to the time point T(k) (in the digital video recorded program) according to the presentation timestamp PTS(k) outputted by the thumbnail file analysis unit 115 to generate decoded data corresponding to the time points near the time point T(k) (in the digital video recorded program). The decoded data comprise the presentation timestamp PTS(k). Thus, the apparatus 100 is capable of starting playback from the position of the decoded data corresponding to the time point T(k) (in the digital video recorded program) for the user to view.

Figure 5:
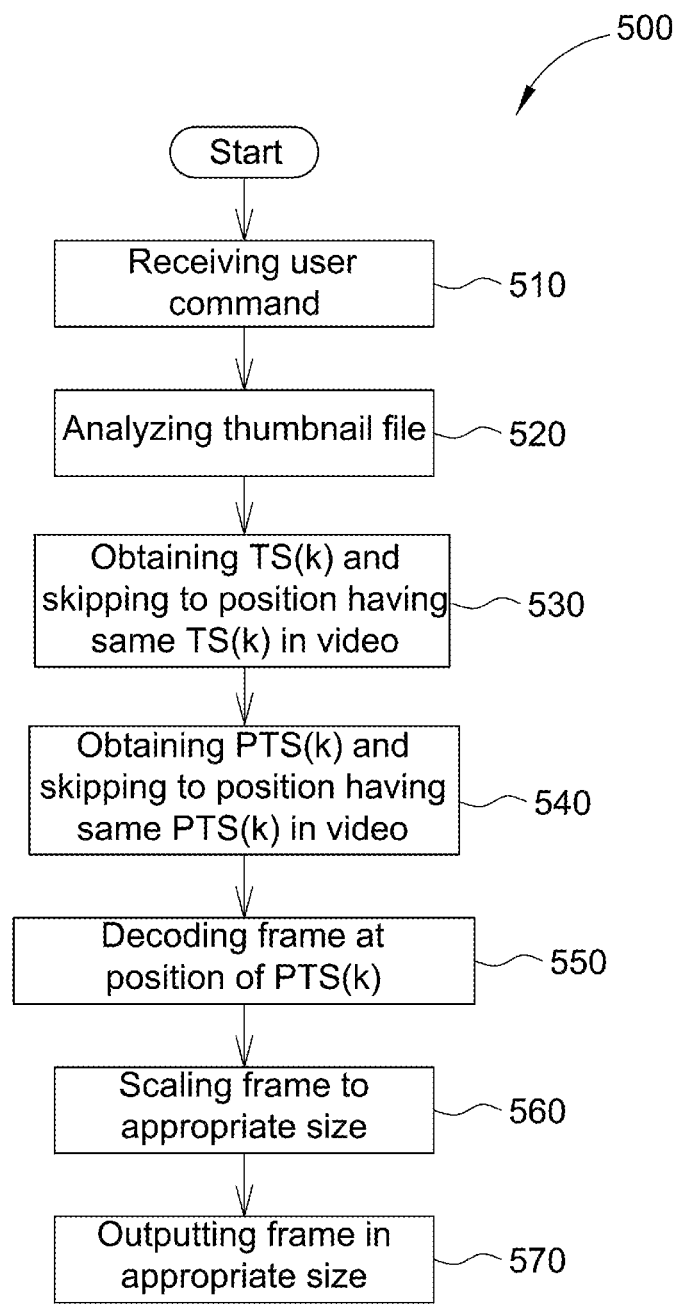
FIG. 5 is a process involved for playing a selected thumbnail in the method in FIG. 2 according to an embodiment.

FIG. 5 shows a process 500 involved for playing a selected thumbnail in the method 200 in FIG. 2 according to an embodiment. The process 500, applicable to the architecture for playing a selected thumbnail in FIG. 4, is described as below.

In step 510, the command reception unit 110C receives a user command such as another command CMD'. The command CMD' instructs the apparatus 100 to start providing a service of "starting playback according to selected thumbnail", and more particularly, the command CMD' instructs the apparatus 100 to start playing from the position represented by the thumbnail P(k).

In step 520, the thumbnail file analysis unit 115 analyzes a thumbnail file, e.g., the above thumbnail file, corresponding to the digital video recorded program to provide the timestamp TS(k) and the presentation timestamp PTS(k) to the processing circuit (more particularly the above processor 110P executing the at least one code) and the decoding unit 114.

In step 530, the processing circuit (more particularly the above processor 110P executing the at least one code) obtains the timestamp TS(k), and skips to the video section such as the position of the same timestamp TS(k) in the above digital video recorded program.

In step 540, the decoding unit 114 obtains the presentation timestamp PTS(k), and skips to a video section such as the position of the same presentation timestamp PTS(k) in the above digital video recorded program.

In step 550, the decoding unit 114 decodes the frame at the position of the presentation timestamp PTS(k).

In step 560, the scaling unit 116 scales the frame to an appropriate size.

In step 570, the scaling unit 116 outputs the frame in the appropriate size, and particularly, the scaling unit 116 outputs the frame F(T(k)) through the above output queue to the display device 150.

Therefore, in digital video recording operations, a digital multimedia recording/playback system implementing the method and apparatus disclosed by the present invention is capable of, in real-time, recording thumbnails and associated information of user-preferred time points according to user controls. When a user selects a digital video recorded section, the digital multimedia recording/playback system is capable of precisely providing the user with thumbnails of user-preferred time points for the user to choose from, thereby enhancing user viewing experiences by precisely offering the user with options of user-preferred time points.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for generating a thumbnail file, comprising:
   receiving a command;
   obtaining time information corresponding to the command and a frame to be output;
   adjusting the frame to be output to a predetermined resolution according to a resolution of the frame to be output to generate a thumbnail; and
   generating the thumbnail file according to the time information and the thumbnail, the thumbnail file containing the thumbnail, a corresponding timestamp and a corresponding presentation timestamp,
   wherein the time information comprises the timestamp and the presentation timestamp corresponding to the command, and wherein a minimum unit of the presentation timestamp is less than one second and a minimum unit of the timestamp is one second, and
   wherein the step of obtaining the time information corresponding to the command and the frame to be output comprises:
   demultiplexing an encoded data to generate a specific demultiplexed result, and retrieving the timestamp from the specific demultiplexed result; and
   decoding the specific demultiplexed result to generate a specific decoded data, and retrieving the presentation timestamp from the specific decoded data.

2. The method according to claim 1, wherein the step of obtaining the time information corresponding to the command and the frame to be output further comprises:
   demultiplexing an encoded data to generate a specific demultiplexed result;
   decoding the specific demultiplexed result to generate a specific decoded data, wherein at least a part of the specific decoded data represents a decoded output frame; and
   selectively scaling the decoded output image to generate the frame to be output.

3. An apparatus for generating a thumbnail file, comprising:
   a reception unit, for receiving a command;
   an extraction unit, for obtaining a frame to be output according to the command;
   a processing circuit, for adjusting the frame to be output to a predetermined resolution according to a resolution of the frame to be output to generate a thumbnail;
   a thumbnail file generation unit, for obtaining time information according to the command and generating the thumbnail file according to the time information and the thumbnail, the thumbnail file containing the thumbnail, a corresponding timestamp and a corresponding presentation timestamp,
   wherein the time information comprises the timestamp and the presentation timestamp corresponding to the command, and wherein a minimum unit of the presentation timestamp is less than one second and a minimum unit of the timestamp is one second;
   a demultiplexing unit, for demultiplexing an encoded data to generate a plurality of demultiplexed results comprising a specific demultiplexed result, wherein the demultiplexed results respectively comprise different timestamps; and
   a decoding unit, for decoding the specific demultiplexed result to generate a plurality of decoded data comprising a specific decoded data, wherein the decoded data respectively comprise different presentation timestamps;
   wherein, the thumbnail file generation unit retrieves the timestamp corresponding to the command from the specific demultiplexed result, and retrieves the presentation timestamp corresponding to the command from the specific decoded data.

4. The apparatus according to claim 3, further comprising:
   a demultiplexing unit, for demultiplexing an encoded data to generate a plurality of demultiplexed results comprising a specific demultiplexed result;
   a decoding unit, for decoding the specific demultiplexed result to generate a plurality of decoded data comprising a specific decoded data comprising a specific decoded data, wherein at least a part of the specific decoded data represents a decoded output frame; and
   a scaling unit, for selectively scaling the decoded output frame to generate the frame to be output.

5. A playback method based on a thumbnail file, comprising:
   receiving a command corresponding to the thumbnail file;
   obtaining a timestamp and a presentation timestamp contained in the thumbnail file, wherein a minimum unit of the presentation timestamp is less than one second and a minimum unit of the timestamp is one second;
   obtaining and demultiplexing an encoded data corresponding to the thumbnail file to generate a plurality of demultiplexed results comprising a specific demultiplexed result, and selecting the specific demultiplexed result according to the timestamp, wherein the demultiplexed results respectively comprise different timestamps;
   decoding the specific demultiplexed result to generate a plurality of decoded data comprising a specific decoded data, and selecting the specific decoded data according to the presentation timestamp, wherein the decoded data respectively comprise different presentation timestamps; and
   starting playback from the specific decoded data.

* * * * *